United States Patent

[11] 3,589,024

| [72] | Inventor | Eduard Sulcs<br>Ljungaverk, Sweden |
|---|---|---|
| [21] | Appl. No. | 835,754 |
| [22] | Filed | June 23, 1969 |
| [45] | Patented | June 29, 1971 |
| [73] | Assignee | KemaNord<br>Stockholm, Sweden |
| [32] | Priority | June 27, 1968 |
| [33] | | Sweden |
| [31] | | 8741/68 |

[54] DRYING OF POROUS PRILLS
10 Claims, No Drawings

| [52] | U.S. Cl. | 34/9 |
|---|---|---|
| [51] | Int. Cl. | F26b 3/00 |
| [50] | Field of Search | 34/9, 71 |

[56] References Cited
UNITED STATES PATENTS

| 2,730,814 | 4/1970 | Giachino | 34/9 |

FOREIGN PATENTS

| 805,112 | 11/1958 | Great Britain |
| 866,393 | 4/1961 | Great Britain |
| 199,463 | 1965 | Sweden |

*Primary Examiner*—John J. Camby
*Attorney*—Fred C. Philpitt

ABSTRACT: A process for drying porous prills of ammonium nitrate which comprises treating moist prills with an alkyl amine having at least six carbon atoms, and drying the treated prills to a moisture content of less than about 0.4 percent by weight.

DRYING OF POROUS PRILLS

BACKGROUND OF INVENTION

The drying of hygroscopic granules, such as ammonium nitrate granules, is difficult since a thin but relatively tight layer of saturated solution is easily formed on the surface of the granules, which blocks the capillaries through which the moisture could escape.

According to the U.S. Pat. No. 2,730,814 the drying is facilitated if the moist granules are treated with kieselguhr or with similar inorganic, porous materials. That process is suitable for the drying of fertilizer grade ammonium nitrate prills, but is not suitable for the drying of ammonium nitrate which is to be employed as a component in explosives, because of the desensitizing effect of the inorganic materials.

Another method of drying ammonium nitrate prills is to employ such a high temperature of the drying medium that the surface layer of the granules fuses and becomes almost dense. In this case a central cavity is formed in every prill and the moisture escapes via a relatively coarse channel leading to the prill's surface. By this process the ammonium nitrate obtains the high density of about 1.0, which is advantageous if the product is to be used as a fertilizer.

When ammonium nitrate prills are to be used as the main component in ANFO-explosives (ANFO = Ammonium Nitrate⊖Fuel Oil), the density of the prills should be about 0.8 and the porosity of the prills should be evenly distributed and controlled throughout their entire cross section. This uniformity in porosity is important in order that the oil absorption and oil retention properties of the prills may be controlled and regulated to meet the requirements for blasting purposes.

The prilling process must be adjusted so that the granules possess the above-mentioned properties of porosity and density. One of the adjustments is to regulate the water content of the melt to be prilled to a suitable level which is usually between 4 and 8 percent. When the granules leave the prilling tower, they have such a high and evenly distributed moisture content, usually about 3 percent, that they cannot be stored without first being subjected to a drying process.

Since the drying has to be carried out in such a manner that the porous structure is not deteriorated nor destroyed, it is not possible to employ the high temperatures normally used in a rotary dryer, as fusing of the surface layer might occur at such temperatures. If on the other hand the prills are to be dried at temperatures sufficiently low so as not to impair the porosity of the prills, it is necessary to use a long drying period which is complicated, and it is necessary to use a dryer which is very large in relation to its capacity.

The present invention makes it possible to increase the drying capacity in an existing dryer while retaining the porous structure of the prills. We have thus found that the drying time is greatly reduced when the moist prills coming from the prilling tower are treated with a small amount of an alkyl amine having at least six carbon atoms in the alkyl chain. Preferably the amount of alkylamine is from about 0.01—0.1 percent by weight based upon the weight of the prills.

The alkylamine preferably has from 16—20 carbon atoms in the alkyl chain. Suitable alkylamines useful in the present invention include 2-ethylhexyl amine, $n$-decylamine, $n$-hexylamine, $n$-octadecylamine, $n$-dodecylamine, $n$-hexadecylamine, $n$-pentadecylamine, $n$-hendecylamine, and $n$-tetradecylamine.

The most preferred alkylamine is $n$-octadecylamine.

It is believed that the alkyl amine is so effective partly because the amine groups of the alkyl amines have a high affinity to the prills to be dried and partly because the alkyl chains of the amines have no affinity to water. The surface of the prills and the capillaries will thus be uniformly covered with an extremely thin, possibly monomolecular layer, of hydrophobic alkyl ammonium nitrate which prevents fusing and facilitates the evaporation in the drying process.

It has not been heretofore known to apply amines to moist prills so as to improve the formation and so as to strengthen the porous structure so that it will not deteriorate during the drying of the prills. It has also not been heretofore known to speed the drying process by treating the moist prills with amines.

In comparative laboratory tests with prills leaving the prilling tower of a pilot plant with a moisture content of 4 percent, the untreated prills after having been dried for 7 hours under such conditions that the porous structure would not be impaired still had a moisture content of about 1 percent. After a relatively short time of storage the remaining moisture had damaged the porous granule structure and made the prills unsuitable for blasting purposes. When the prills, were subjected to a surface treatment with 0.1 percent by weight of $n$-octadecyl-amine, the moisture content of the prills was reduced to 0.25 percent after only two hours of drying under the same conditions employed for the above-mentioned untreated prills. The treated prills also exhibited a stable porosity during storage.

Only with one known drying auxiliary agent, colloidal silicon dioxide (Aerosil), could the same effect be accomplished but the amount of this agent had to be 30 times larger, that is 3 percent.

The best results are obtained when the amine is spread over the surfaces of the prills in the form of a liquid. If the temperature in the dryer is lower than the melting point of the preferred amines which have 16—20 carbon atoms, an alkyl amine having a shorter alkyl chain and thus having a lower melting point can be employed. When alkyl amines with short alkyl chains are employed, however, the effect on the drying process is somewhat reduced and an alkyl chain containing 6 carbon atoms represents the lower limit for most practical purposes. Also it may be convenient to facilitate the spreading by adding the alkyl amine as a solution for instance in a liquid hydrocarbon. It is of course recognized that the alkyl amine should not be added in an aqueous diluent since the purpose of the invention is to reduce the water content.

The alkyl amine can be added immediately before the nitrate prills are introduced into the dryer. If the drying process is carried out in two steps, including a first step employing hot air and a second step combining a final drying and a cooling with air of a lower temperature, an improved drying effect is also accomplished when the alkyl amine is added prior to the second step.

The agitation of the nitrate prills in the drying processes usually employed on an industrial scale is normally sufficient to ensure a uniform distribution of the alkyl amines without a premixing operation.

EXAMPLES

In the manufacture of porous ammonium nitrate prills having a diameter of 1—2 mm. the prills were continuously recovered from the bottom of the prilling tower and had a moisture content of $\leq$ 3.5 percent. The prills were fed in two consecutive rotary dryers of the following construction and operation data:

|  | Dryer No. 1 | Dryer No. 2 |
| --- | --- | --- |
| Length, m | 3.1 | 2.5 |
| Diameter, m | 1.15 | 0.5 |
| Temperature (° C.) of— |  |  |
| Drying air at the inlet end of the dryer | 125 | 20 |
| Moist prill feed | 60—80 | 55—75 |
| Discharged prills | 55—75 | 25—30 |

The prills and the air were conducted in countercurrent flow through both dryers.

In the table below all tests apart from No. 1 refer to addition of 0.05 percent of molten octadecyl amine to the prills to be dried.

| Amine, addition | Production of prills, kg. h. | Moisture content in percent by weight after dryer Number— | |
| --- | --- | --- | --- |
| | | 1 | 2 |
| Test: | | | |
| 1 ... None | 300 | 3.1 | 2.7 |
| 2 ... Before dryer No. 1 | 300 | 0.50 | 0.31 |
| 3 ... do | 350 | 0.58 | 0.44 |
| 4 ... Before dryer No. 2 | 150 | 1.06 | 0.27 |
| 5 ... do | 200 | 1.35 | 0.51 |

The products obtained from tests 2—5 had a density of 0.8 and an oil absorption of 9 percent. The product resulting from Test No. 1 had a considerably lower oil absorption and could not be used after a short time of storage because the porous prill structure was not strong enough. Supplemental experiments have shown that the moisture content preferably should be lower than about 0.4 percent if the ammonium nitrate prills even after a long storage time, are to retain their mechanical strength and the porous structure which is ideal for ANFO-blasting.

What I claim is:

1. A process in the manufacture of porous prills of ammonium nitrate useful for blasting purposes comprising treating moist prills coming from the prilling tower with a minor amount of an alkyl amine having at least 6 carbon atoms in the alkyl chain, and then drying said prills to a moisture content of less than about 0.4 percent by weight.

2. A process as claimed in claim 1 wherein the amount of alkyl amine is in the range from 0.01—0.1 percent by weight.

3. A process as claimed in claim 1 wherein the alkyl amine is octadecyl amine.

4. A process as claimed in claim 1 wherein said alkyl amine has from 16—20 carbon atoms in the alkyl chain.

5. A process as claimed in claim 2 wherein said alkyl amine is octadecyamine.

6. A process as claimed in claim 1 wherein said alkyl amine is molten octadecyl amine.

7. The process of claim 1 wherein the drying of the prills is carried out in two steps.

8. The process of claim 7 wherein the moist prills are treated with the amine prior to the first of the two drying steps.

9. The process of claim 7 wherein the moist prills are treated with the amine prior to the second of the two drying steps but subsequent to the first of the two drying steps.

10. A process as claimed in claim 5 wherein said octadecyl amine is molten.